June 9, 1953 R. H. DICKE 2,641,656

SOUND RECORDING AND REPRODUCING APPARATUS

Filed May 17, 1950

Inventor

Robert H. Dicke

By Oscar H. Hicke

His Attorney

Patented June 9, 1953 2,641,656

UNITED STATES PATENT OFFICE 2,641,656

SOUND RECORDING AND REPRODUCING APPARATUS

Robert H. Dicke, Princeton, N. J.

Application May 17, 1950, Serial No. 162,479

22 Claims. (Cl. 179—100.2)

This invention relates to a sound recording and reproducing apparatus of the magnetic type and more particularly of the type in which a record is made of durations of specific frequencies and their relative phases rather than a record of the wave form of a complex sound wave.

This application is a continuation, as to the common subject matter, of my co-pending application Ser. No. 745,438 filed May 2, 1947 which is now Patent No. 2,508,451.

An object of the present invention resides in the provision of recording and reproducing apparatus which can faithfully record and reproduce music, speech or other sounds by the employment of magnetic recording tape moving at a comparatively low speed.

Another object of the present invention resides in the provision of recording and reproducing apparatus characterizing a large number of frequencies together with separate means for detecting such frequencies in the process of recording the sound and in re-enacting such frequencies in the process of reproducing the sound.

Another object of the present invention resides in the provision of recording and reproducing apparatus which separates sounds into various components and in recording and reproducing these components through the medium of a large number of magnetic sound tracks in multiple, one sound track polyphase in character for each principal component.

More specifically it is proposed to convert composite sound waves into current intensities, to convert these current intensities into magnetic intensities, to modulate these magnetic intensities at a plurality of modulating frequencies to produce beat frequencies characterizing both frequency and direction of phase rotation and to record these beat frequencies on a magnetic tape and in then reproducing the original sound waves from such magnetic tape.

Other objects, purposes and characteristic features of the present invention will become apparent from the following description when considered in the light of the accompanying drawings in which.

Figures 1, 2, 3, 4, 5, 6, 7, 8, 9:
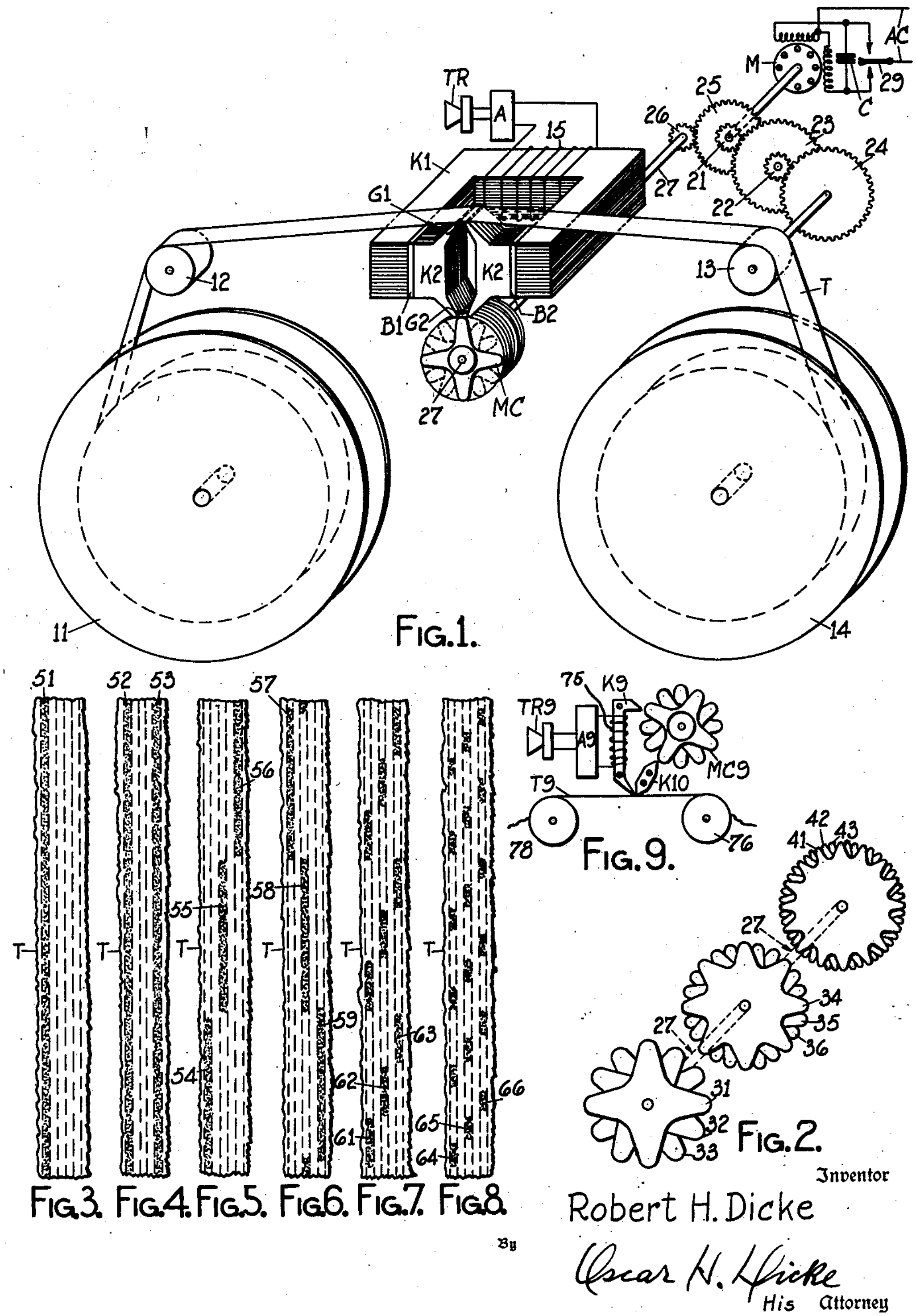
Fig. 1 illustrates conventionally and in perspective one embodiment of the invention.
Fig. 2 illustrates in perspective an exploded view of a portion of the magnetic modulator cylinder shown in Fig. 1.
Figs. 3 and 4 show two portions of magnetic tape strip, greatly enlarged, in which the heavy dots signify magnetizattion and illustrate two different conditions of phase of a recorded zero frequency beat frequency.
Figs. 5 and 6 illustrate two portions of magnetic tape similar to those of Figs. 3 and 4 each illustrating a low beat frequency of the same frequency but having phase rotations in opposite directions.
Fig. 7 illustrates magnetic recording tape having recorded thereon a beat frequency having the same direction of phase rotation as that of Fig. 5 but of substantially twice the frequency of that recorded in Fig. 5.

Fig. 8 illustrates a magnetic tape record of a beat frequency having the same direction of phase rotation as that recorded in Figs. 5 and 7 but characterizing a frequency substantially twice that illustrated in Fig. 7 and four times that illustrated in Fig. 5; and Fig. 9 illustrates a modified form of the invention in which the magnetic modulator is included in series in the magnetic circuit including the recording air-gap whereas in Fig. 1 the magnetic modulator is in multiple with the recording air-gap.

*Fig. 1 structure.*—In this form of the invention the magnetic modulator cylinder MC is in multiple with the recording air-gap whereas in the Fig. 9 construction it is included in series in the magnetic circuit. The U-shaped portion $K_1$ of the magnetic core structure K is composed of U-shaped laminae of magnetic material whereas the laminae of the recording and modulation portion $K_2$ of the core structure is laminated in a plane at right-angle thereto and is separated therefrom magnetically by fibre plates $B_1$ and $B_2$ or other non-ferromagnetic material to produce the effect of auxiliary air-gaps. Each sheet of iron laminae of the core portion $K_2$ is separated from the adjacent sheet of laminae by a punching of non-ferromagnetic material of the same shape and substantially the same thickness so as to constitute a large number of magnetic paths in multiple. This core portion $K_2$ may conveniently be called the recording-modulation head and constitutes two air-gaps in multiple, namely, the recording gap $G_1$ and the modulation gap $G_2$. The magnetic recording tape T is caused to move by the gap $G_1$ and substantially at right angles thereto and the modulating cylinder MC cooperates with the gap $G_2$ in a manner more fully described hereinafter. This recording tape T is originally stored on storage spool 11, passes over idler roller 12, then over recording gap $G_1$ of the recording and modulating head $K_2$, then over capstan 13 driven by motor M and then to storage spool 14. The modulator cylinder MC and the capstan 13 are operated by gear trains from the same motor M and therefore operate at synchronously related speeds. The magnetic tape T and capstan 13 are operated by motor M through pinions 21 and 22 and gears 23 and 24 and the modulating cylinder MC is driven by gear 25 and pinion 26. The motor M may be of any suitable construction and for convenience a reversible condenser type split-phase induction motor, of the squirrel cage type, has been illustrated. When the switch 29 assumes one extreme position the condenser C is included in series with one of the two 2-phase windings of the stator to cause forward operation and when it assumes the other extreme position this condenser C is included in series with the other winding to cause reverse operation of the motor. The storage spools 11 and 14 are preferably driven one at a time through a slip clutch (not shown) so that the speed of movement of the tape is wholly determined by the capstan 13, that is, these spools 11 and 14 are driven, one at a time, for different directions of operations of the motor M, so that one spool is driven during recording and play-back and the other is driven during rewind.

The iron core K is provided with a coil or winding 15 which is either supplied with current from the amplifier A, as during recording operation, or supplies voltage to the amplifier as induced by the magnetic fields in tape T as modified by the modulator MC during play-back operation. Obviously, since an amplifier amplifies in one direction only special wire connections must be made and must be reversed for each change from recording to play-back operation, and vice versa, and these connections are conventionally shown by the box-like illustration of the amplifier A which includes the necessary wires, switches, electron-tubes and sources of current to cause this amplifier to operate properly for both recording and play-back operation. The other side of this amplifier A is connected to the microphone loudspeaker TR which may serve as both a microphone and as a loudspeaker as required.

The tape T is preferably constructed of cellulose or paper, impregnated or coated with iron filings, steel filings or ferrous oxides or other suitable ferromagnetic material, such that residual magnetic fields of minute magnitude may be stored therein.

As already pointed out the combined recording and modulating head $K_2$ is part of a core structure K of which the $K_2$ portion has each sheet of iron laminae separated from its adjacent sheets of laminae by suitable non-ferromagnetic material such as fibre or paper punchings. The modulating cylinder or rotor MC similarly has each sheet of iron laminae spaced from its adjacent toothed iron disk or laminae by a fibre or paper punching. The modulating cylinder is so located with respect to the modulating air-gap $G_2$ that each iron laminae sheet in the rotor MC lines up with a corresponding width iron laminae sheet of the recording and modulating head $K_2$. The net result is that a large number of recording head segments each form a separate recording magnetic partial circuit, each of which is modulated only by one particular toothed disk of the modulating cylinder, so that each iron laminae sheet of the recording head makes its own record track on the magnetic tape. It is desired to point out here that the non-ferrous plates $B_1$ and $B_2$ which magnetically separate the core portions $K_2$ from core $K_1$ have been provided so that the individual effect that a particular modulator disk has on a particular laminae in the recording air-gap is more pronounced. In other words, each modulating disk effectively modulates the magnetism in one laminae of the recording head $K_2$ only. Also, since these laminae are spaced apart each laminae makes its own sound track on the magnetic recording tape.

As illustrated in Fig. 2 the toothed iron disks of the modulating cylinder come in groups of three identical iron disks which are so fastened to the shaft 27 that the teeth of each group are phase displaced one-third of a tooth pitch. For instance, since the disks 31, 32 and 33 each have four teeth, these teeth of different disks are displaced one-third tooth pitch or 30° (thirty degrees). Similarly the teeth of disks 34, 35 and 36 are displaced one-third tooth pitch or 15° (fifteen degrees) and the teeth of disks 41, 42 and 43 are displaced one-third tooth pitch or seven and one-half degrees. If we assume that the shaft 27 rotates at 9000 R. P. M., or 150 R. P. S., then these three three-phase modulators will generate 600, 1200 and 2400 cycles per second, respectively. It should be understood that various specific modulating frequencies may be chosen. Also, these multiphase modulators are not necessarily 3-phase but may be four or more phase.

It should be understood that the teeth of each modulator disk are of such shape that they will cause sine wave modulation of a constant magnetic field. As a result of this tooth shape the three modulator disks will, by further reason of their one-third tooth pitch displacement, when modulating a constant magnetic field, produce zero modulation. This is true because the effect of any one disk will neutralize the effect produced by the other two disks. This is, however, not true when modulating a changing magnetic field because the changing magnetic field will be different when different modulating disks of the same frequency group perform a pronounced modulating function.

*Operation Fig. 1.*—The process of recording and reproducing sound according to the present invention will now be considered. As a complex sound wave, either music or speech or any other sound, enters the device TR, which performs the function of a microphone during recording operation, it produces corresponding current fluctuations in the coil 15 through the medium of the amplifier A. These fluctuations constitute in fact a plurality of sine wave fluctuations superimposed upon each other, each of which will be affected by the modulators the same as it would be if it alone were present. Stating it briefly, the apparatus shown in Fig. 1 will magnetically modulate the fluctuating magnetic field produced by the coil 15 by the action of the modulating cylinder MC on the air-gap $G_2$ which is in multiple with the recording air-gap $G_1$. As a result of this mechanical magnetic modulation beat frequency magnetic fields of the applied frequency and the modulation frequency pass over the recording gap $G_1$ and are recorded on the tape T, as it slowly moves by the recording air-gap $G_1$, by leaving residual or permanent magnetism in the magnetizable tape T along paths in engagement with those laminae of the recording head $K_2$ which are least shunted by the modulator MC when the magnetomotive force of coil 15 is instantaneously high. By reason of the magnetic separation of the iron disks of the modulating cylinder MC and the magnetic separation of the laminae of the recording head $K_2$ and the fact that these laminae and disks are in alignment separate record tracks, one for each disk and laminae, are made on the record tape.

The tape is then rewound on the spool 11 on which it was contained before a record was made thereon, as by reversing the switch 29 to cause reverse operation of the motor M and conveniently called rewind. During this rewind operation the coil 15 is preferably open-circuited or short-circuited, but may, if desired, be connected to cause backward play-back action on the loudspeaker TR. Upon completion of the rewind operation the amplifier is reversed in the circuit by means confined within rectangle A and then the record is played back by operating both the tape T and the modulator MC in the same direction as they were operated during the recording operation. During this playback operation the movement of the tape T by the air-gap $G_1$ induces a magnetomotive force in the core structure in conformity with the beat frequency recorded on this tape. This magneto-motive force tries to induce the beat frequency recorded in the coil 15 but is prevented from doing so by reason of the action of the modulator MC. The frequencies that are induced in coil 15 are the frequencies that result from the mixing of the frequencies induced by the tape and the frequencies induced by the modulator MC. The resultant frequencies that reach the amplifier A and the loudspeaker TR are the same as those that entered the device TR when it served as a microphone.

A little more consideration must now be given as to what actually takes place during the recording and playback operation. In this connection it is desired to point out that one of the features of the present invention resides in the fact that all of the undesired frequencies that accompany the recording and audible reinstating of beat frequencies are eliminated. As pointed out above a modulator for modulating the magnetic field at numerous successively higher frequencies is employed. This modulator modulates the magnetic field characteristic of the tones to be recorded so that the magneto-motive force applied to the modulator during playback is modulated at the beat frequency of the tone frequency and the modulator frequency. It is, however, well known that if two frequencies are superimposed upon each other both "sum" and "difference" beat frequencies will result. For instance frequencies of 400 C. P. S. and 2800 C. P. S. may be obtained by superimposing 1200 C. P. S. and 1600 C. P. S. upon each other. Furthermore, if these beat frequencies of 400 C. P. S. and 2800 C. P. S. are, upon reproduction, modulated by the modulator frequency of one of these frequencies, say, 1200 C. P. S. the resultant frequencies of 800 C. P. S., 1600 C. P. S. and 4000 C. P. S. will be obtained. It is thus seen that an original sound frequency of 1600 C. P. S. would by ordinary modulation and playback have become 800 C. P. S., 1600 C. P. S. and 4000 C. P. S. sound frequencies. If now from this consideration we go farther and assume that a tone frequency of 1500 C. P. S. is modulated by modulator frequencies of 1200 C. P. S. and 2400 C. P. S., as could very easily be the case in applicant's system, beat frequencies of 300 C. P. S., 2700 C. P. S., 900 C. P. S. and 3900 C. P. S. will result and if the first two upon reproduction are again modulated by the 1200 C. P. S. magnetic reluctance modulator 900 C. P. S., 1500 C. P. S. and 3900 C. P. S. will result and if the second two frequencies of 900 C. P. S. and 3900 C. P. S. are upon reproduction again modulated by the 2400 C. P. S. modulator resultant frequencies of 1500 C. P. S., 3300 C. P. S., 1500 C. P. S. and 6300 C. P. S. will result. The total number of reproduced frequencies would therefore be 900 C. P. S., 1500 C. P. S., 3300 C. P. S., 3900 C. P. S. and 6300 C. P. S. An outstanding feature of the present invention is that only the original frequency of 1500 C. P. S. will be reproduced by the apparatus of the present invention, all the others being automatically eliminated. There are two reasons why the, shall we say, imaginary frequencies of 900 C. P. S., 3300 C. P. S., 3900 C. P. S. and 6300 C. P. S. are eliminated. In the first place when the 1500 C. P. S. tone frequency is modulated by the 1200 C. P. S. modulator frequency only the 300 C. P. S. frequency is recorded the 2700 C. P. S. frequency is too high to be recorded on the slow moving magnetic tape and when the 1500 C. P. S. tone frequency is modulated by the 2400 C. P. S. light modulator only the 900 C. P. S. frequency is recorded. These beat frequencies of 300 C. P. S. and 900 C. P. S. are recorded on two different tracks on the tape, namely the tracks of tape passing under the 1200 C. P. S. and 2400 C. P. S. modulators respectively and each of these tracks are divided into three sub-tracks (see Figs. 3–8). When a beat frequency is recorded the maximum magnetization passes from sub-track to sub-track at the beat frequency speed and if such passing from sub-track to sub-track is in one direction (such as 1, 2, 3, taken left to right—see Fig. 5) the beat frequency will be added to the modulator frequency (such as 300+1200=1500) and if the passing is in the other direction (such as 3, 2, 1, taken right to left—see Fig. 6) the beat frequency on the tape will be subtracted from the modulator frequency (such as 2400−900=1500). These two reproduced magnetic frequencies of 1500 C. P. S. are reproduced by two different frequency modulations and are not only of the same frequency but are also in phase so that they will, after transformation and amplification, act accumulatively on the loudspeaker diaphragm.

Stating this more briefly, in making the recording only the difference beat frequency is recorded and this is recorded on three strips of the magnetic tape which strips are modulated at the same modulator frequency but displaced 120 harmonic degrees out of phase. Since the sound frequency is assumed to be different than the modulator frequency maximum magnetization across the recording gap $G_1$ shifts progressively from one to another of the sub-tracks on the tape. The beat frequency recording on the tape causes maximum magnetomotive transmission to shift from modulator to modulator disk upon reproduction and if the direction of shifting is successively in the direction toward advanced phase modulators then the frequency of the sound reproduced is higher than the modulator frequency, but if this shifting is successively toward lagging phase modulators then the sound produced is of a lower frequency than the modulator frequency. It is thus seen that only one, namely the original, frequency is reproduced.

Possibly this can be made still more clear by restating this in somewhat different terms. Each complex sound wave may be resolved into two or more sine wave frequencies. These sound wave frequencies may of course be converted to magneto-motive force frequencies as is evident from applicant's disclosure. The purpose of the invention is to make records of extremely low frequencies so they may be recorded on slow moving tape. For this reason the recording of beat frequencies has been resorted to. However, each time a sine wave is beat by another sine wave both a sum and a difference beat frequency is obtained. Since many successively higher frequency modulators are employed each sound frequency is modulated by both the nearest higher and the nearest lower modulating frequency. In each case only the difference beat frequency is recorded because the summation frequency is too high to be recorded on slow moving tape. In one case the sound frequency is higher than the modulating frequency and in the other case the sound frequency is lower than the modulating frequency. In both cases the beat frequency will be low but in one case the shifting of the heavy magnetization of the tape will be successively toward the advance phase modulator whereas in the other case the shifting of the heavy magnetization track will be successively toward the lagging phase modulator. Upon reproduction this will work out in such a way, due to the specific direction of beat frequency rotation that the original frequency only will be made manifest. In other words before recording the beat frequency created will be a difference beat frequency whereas after reproduction and second modulation it may be either a difference or a sum frequency depending on the direction of rotation of the modulation effect. Using, for example, the same frequencies as above, if a 1500 C. P. S. sound frequency is modulated by 1200 C. P. S. and 2400 C. P. S. modulating frequencies only difference beat frequencies of 300 C. P. S. and 900 C. P. S. will be obtained and recorded and upon reproduction these beat frequencies will be modulated by modulating frequencies of 1200 C. P. S. and 2400 C. P. S. respectively. Since in one case the sound frequency was higher than the modulating frequency and in the other case the sound frequency was lower than the modulating frequency the beat frequencies will shift the heavy magnetization of the tape toward advanced phase and toward lagging phase, respectively, as a result of which summation and difference beat frequencies will result upon reproduction. The net result is 300 C. P. S. will be added to modulator frequency 1200 C. P. S. and 900 C. P. S. will be subtracted from modulator frequency 2400 C. P. S. which is the original 1500 C. P. S. sound frequency and both of these reproduced sound frequencies of 1500 C. P. S. will be in phase and will act accumulatively on the loud speaker. Similarly the 1500 C. P. S. sound created magnetism will be beat by the 600 C. P. S. modulator disk to produce at 900 C. P. S. beat frequency which when recorded and reproduced and again beat at 600 C. P. S. will produce a 1500 C. P. S. sound frequency which is in phase with the former two sound frequencies. In the same way that an envelope of many frequencies may be produced and directly recorded on a record tape, many beat frequencies of specific phase rotation may be recorded on each polyphase modulation recording strip of applicants' recording tape. Although in most instances the summation beat frequencies will not be recorded because the high portion and low portion of a beat frequency cycle will overlap on the slow moving tape and therefore will appear in like density on each of the three phases of the record strip to be lost during playback some extremely low frequency summation beat frequencies may be recorded. For instance, a sound frequency as low as 100 C. P. S. when modulated by the 600 C. P. S. modulator will produce 500 and 700 C. P. S. beat frequencies both of which will be recorded, but since their direction of phase rotation will be opposite the correct 100 C. P. S. tone frequency will be reinstated. In this connection it should be remembered that on playback these beat frequencies of 500 and 700 C. P. S. cannot be modulated by the 1200 C. P. S. modulator disks because they are recorded only on the record strip that passes under the 600 C. P. S. modulator disks during playback, so that the correct frequency sounds are reproduced on playback.

Referring now more particularly to the portions of tape illustrated in Figs. 3–8, let us assume that the tape moves downwardly both during recording and playback, and that the three modulator disks for the portion of tape shown advance the phase in the order left to right. From this consideration it will be seen that the tape portion shown in Figs. 5, 7 and 8 will produce a higher frequency than the modulator frequency whereas the tape shown in Fig. 6, since it characterizes the opposite direction of phase rotation, will produce a lower frequency than the modulator frequency. That is, the Figs. 5, 7 and 8 recording is an addititve beat frequency and the Fig. 6 recording is a subtractive beat frequency. This is true because the tape of Figs. 5, 7 and 8 render the modulators effective in the left-to-right order whereas the tape of Fig. 6 renders the modulators effective in the right-to-left order and since advance phase is the left-to-right order the right-to-left order must be a retard phase causing frequency reduction. As above pointed out the heavy dotted portions 51, 52, 53, 54, 55, 56, 57, 58, 59, 61, 62, 63, 64, 65, and 66 are permanently (during any partitcular recording) magnetized whereas other portions are less magnetized or entirely demagnetized. From the foregoing it is apparent that the magnetized portion 51 of Fig. 3 signifies that a zero beat frequency has been recorded for a particular modulator and that the modulator produced frequency is of a phase corresponding to the phase of the left hand modulator for that frequency. Had this phase been advanced to the extent of one-third cycle it would have made a record on the second sub-track (not shown magnetized) of Fig. 3 and had it been retarded one-sixth of a cycle it would have made a record such as shown by the magnetization of sub-tracks 52 and 53 of Fig. 4.

Let us now assume that the tape portion of Fig. 5 runs over three 1200 C. P. S. modulator disks and that the Fig. 6 tape portion runs over three 2400 C. P. S. modulator disks and that a 1800 C. P. S. current is applied to coil 15 under which condition an additive beat frequency of 600 C. P. S. will be recorded on the tape portion of Fig. 5 as shown and a substractive beat frequency of 600 C. P. S. will be recorded on the tape portion of Fig. 6, as shown. On playback the advance phase beat frequency of 600 C. P. S. recorded in Fig. 5 acting on the 1200 C. P. S. modulator will produce an 1800 C. P. S. voltage in the coil 15 and the retard beat frequency of 600 C. P. S. recorded in Fig. 6 acting on the 2400 C. P. S. modulator will also produce an 1800 C. P. S. voltage in coil 15 and these two voltages will not only be of the same frequency but will also be of the same phase.

In practice the shaft 21 may, for instance, be rotated at a speed of 150 R. P. S. and if modulating teeth on successive 3-phase modulators of 8, 16, 24, 32, 40, 48, and 56 per disk are chosen then modulator frequencies of 1200, 2400, 3600, 4800, 6000, 7200, 8400 C. P. S. will be generated. If we assume this maximum of 1200 C. P. S. between modulating frequencies this proposed structure will take care of sound frequencies up to 9000 C. P. S. by the recording of a maximum beat frequency of 1200 C. P. S. allowing a 100 percent margin over the required 600 C. P. S. In other words, the speed of movement of the tape may be reduced to 13.3% of the tape speed required when the sound is recorded directly on like magnetizable tape. For direct recording on magnetizable tape a tape speed of 7½ inches per second or 450 inches per minute is deemed adequate. If now recordings are made in accordance with the present invention a tape speed of 60 inches per minute or one inch per second only is required. Other modulation frequencies may be chosen in accordance with the degree of fidelity of reproduction and tape speeds desired. The gear ratios of the various gears in Fig. 1 will therefore be so chosen that the shaft 27 operates at the proper speed and the tape T moves at the proper speed.

In recording sound magnetically it is usually necessary to superimpose an inaudible high frequency current upon the sound characterizing current in order to iron out, so to speak, the hysteresis loop lag produced in the ferromagnetic portion of the tape. It is assumed that the amplifier A includes the necessary modulator and associated apparatus for accomplishing this function. Since this feature is not part of the present invention this apparatus has not been specifically shown nor described.

From a study of the foregoing it becomes apparent that the low frequencies will be recorded through a larger number of modulating channels each including a modulating disk than will the higher frequencies and that for this reason the amplifier A should have frequency amplifying gradient characteristics which will compensate for this unbalance in playback volume. Since filtering of currents in accordance with their frequency is a highly developed art, specific means for performing this filtering function has not been disclosed but is presumed present in the conventional amplifier A disclosed.

If it is desirable to use the magnetizable tape T over and over again suitable wipe-out means will be provided. This wipe-out means may comprise an air-gap similar to the gap $G_1$ across which an inaudible frequency of magnetism is applied which may be so high as compared with the speed of movement of the tape thereover that the tape T is substantially demagnetized. If a slight manifestation of this high frequency magnetization should remain on the tape it would be too high to be audible. A uniform magnetization of the tape will not produce a sound in spite of the modulators because the effect produced by the three modulators of any modulating group will neutralize each other.

*Fig. 9 structure and operation.*—In the Fig. 1 construction the modulator gap $G_2$ is in multiple with the recording and play-back gap $G_1$ and therefore the teeth of the modulator disks reduce the amount of magnetism passing through the tape. It may be desirable in certain applications of the invention to have the modulator teeth increase the amount of magnetism passing through the tape T. To accomplish the latter result the modulator would be included in series in the magnetic circuit of the core structure and such a construction has been illustrated in Fig. 9.

In this structure the coil 75 corresponds to the coil 15 of Fig. 1, the amplifier $A_9$ corresponds to the amplifier A of Fig. 1 and the microphone-loudspeaker $TR_9$ corresponds to the device TR of Fig. 1. The tape $T_9$ is held against the recording-playback gap $G_9$ in the magnetic circuit of the core $K_9$—$K_{10}$, through the medium of the capstan 76 and idler roller 78. It will be observed that the gap in which the modulator $MC_9$ is included is rather large and includes a substantial portion of modulator $MC_9$. This is satisfactory because this gap spans 90° of the modulator and the modulator teeth spacing of all the modulator disks shown in Fig. 2 is such that the total number of teeth in any disk is divisible by four, so that simultaneous registration of two teeth 90° apart of any disk occurs. The modulator $MC_9$ is of the same construction as is modulator MC.

The recording and playback operation of the Fig. 9 structure is the same as that of Fig. 1 and this operation need therefore not be repeated.

The applicant has thus shown and described two rather specific embodiments of his invention but it should be understood that these embodiments do not exhaust all possible structures that may be used in carrying out the invention and that they have been shown to facilitate the description of the underlying principles of the invention and how these principles may be taken advantage of in practicing the invention and it should further be understood that various changes, modifications and additions may be made within the scope of this invention so long as these changes do not depart from the spirit and scope of the invention as defined by the following claims.

What I claim as new is:

1. The method of recording and reproducing sound which consists in converting sound vibrations into electromagnetic density oscillations, in resolving these magnetic density oscillations into a plurality of separate magnetic path components, in beating each magnetic path component with a frequency related frequency in a manner so as to create comparative low beat frequencies some of which characterize a direction of phase rotation, in magnetically recording these beat frequencies each for its specific duration on a magnetizable record tape, in reproducing these magnetic beat frequencies, and in again beating them at the same frequencies and relative phase as the original magnetic path components from which they were created were beat so as to reproduce the aforementioned various frequency components, and in converting the last mentioned frequency components into sound.

2. In combination, a recorder-reproducer comprising: means for converting sound waves into magnetic oscillations, a mechanically driven modulator for separating said magnetic oscillations into various beat frequencies some of which characterize a direction of phase rotation, means for recording these magnetic oscillation beat frequencies on separate strips of a magnetizable record tape for their respective durations; and a reproducer including a mechanically driven modulator for producing specific magnetic oscillation beat frequencies for specific durations from the strips of the record tape on which a record was made by said recorder and for modulating such beat frequencies to characterize direction of phase rotation to reproduce the original magnetic oscillations, and means for converting such reproduced magnetic oscillations into sound waves.

3. In combination, a recorder-reproducer comprising; means for changing sound waves into a major stream of complex magnetic oscillations, means for separating such major stream of magnetic oscillations into a large number of minor magnetic flux streams and for modulating each minor flux stream distinctively as to frequency and in some instances to characterize a direction of phase rotation, and means for magnetically recording on separate tracks one track for each minor flux stream on a magnetizable record strip the magnetic density of each minor flux stream as modified by such modulation; and a reproducer including means for producing minor magnetic flux streams from such record strip one stream for each track, means for distinctively modulating as to frequency and direction of phase rotation each minor magnetic flux stream so produced in like manner as it was modulated before being recorded, and means for combining all of these minor modulated magnetic flux streams into a complex audible flux stream and for converting it into an electric current.

4. The method of recording and reproducing sound which resides in converting sound waves into recordable magnetic oscillations, in modulating these recordable magnetic oscillations so as to produce multiphase magnetic beat frequencies for each modulating frequency such that the phase displacement between these multiphase displaced beat frequencies for each modulating frequency results in a beat frequency of a frequency and direction of phase rotation dependent on both the original sound frequency and the frequency of modulation, in magnetically recording short period averages of these magnetic frequencies one record for each modulation frequency and phase on magnetizable tape, and in reproducing the original sound waves by modulating each multiphase reproduced magnetic beat frequency at the same frequency and direction of phase rotation as the original recordable magnetic oscillations from which the beat frequency was created was modulated.

5. The method of recording and reproducing sound which resides in converting sound into electric current fluctuations, in converting said current fluctuations into magnetic density fluctuations, in modulating these magnetic density fluctuations at various frequencies each frequency at a number of phases so as to produce multiphase magnetic density beat frequencies such that the net unbalance between phases of these beat frequencies results in a beat frequency of phase rotation dependent on both the original frequency and the frequency and phase of modulation, in magnetically recording these magnetic density beat frequencies a composite record for each modulation frequency and phase modulation on magnetizable tape, and in reproducing the original sound by modulating the reproduced magnetic density beat frequencies at the same frequency and same relative phase as the corresponding original magnetic density fluctuations converted from sound frequencies were modulated.

6. The method of recording and reproducing sound consisting of a multiplicity of sound frequencies, which resides in converting these sound frequencies into magnetic density frequencies, in modulating these magnetic density frequencies at a plurality of frequencies and relative phases each modulating frequency occurring a number of times with different phases of which each group of like modulating frequencies are so phase displaced that their net modulation of a constant magnetic field is zero, in recording the beat frequencies obtained by so modulating said magnetic density frequencies, in reproducing these magnetic density beat frequencies and in again modulating each magnetic density beat frequency at the same frequency and relative phase as the original magnetic density frequency was modulated to create such recorded and reproduced magnetic density beat frequency to thereby reproduce the original multiplicity of magnetic field strength frequencies.

7. The method of recording and reproducing sound consisting of a plurality of sound frequencies which consists in converting these sound frequencies into electromagnetic density frequencies, in modulating these magnetic density frequencies at a plurality of modulating frequencies so as to produce both summation and difference magnetic density beat frequencies, each modulating frequency occurring several times with different phases the phases of these modulating frequencies being related to each other to define one sense of phase rotation of beat frequencies if the magnetic density frequency was greater than the modulating frequency and an opposite sense of phase rotation beat frequency if the magnetic density frequency was lower than the modulating frequency, in magnetically recording only said difference beat frequencies, in reproducing magnetically said difference beat frequencies, in modulating each of said reproduced magnetic difference beat frequencies at the same modulating frequency and relative phase as the magnetic density frequency was modulated to produce such beat frequency before it was magnetically recorded and further in a manner so that summation frequencies will be produced from the reproduced difference beat frequency in response to this second modulation only if the original magnetic density frequency was higher than its modulating frequency and so that a difference frequency will be produced from the reproduced difference beat frequency by such second modulation only if the magnetic density frequency was lower than its modulating frequency.

8. The method of recording and reproducing a signal consisting of a plurality of magnetic frequencies which resides in magnetically modulating these magnetic frequencies at a plurality of groups of successively higher modulating frequencies of which each group consist of like modulating frequencies which are of the same frequency but differing in phase, in magnetically recording only the magnetic difference beat frequencies so created, in magnetically reproducing such difference magnetic beat frequencies, in again magnetically modulating each difference magnetic beat frequency at the same frequency and relative phase as the signal magnetic frequency from which it was created was magnetically modulated before recording as a result of which only the initial magnetic frequencies are reproduced.

9. A system for recording and reproducing sound consisting of a multiplicity of sound frequencies comprising means for converting such sound frequencies into magnetic field strength frequencies, a magnetizable recording tape, a plurality of magnetic modulating devices each modulating at a different frequency and each modulating device comprising a plurality of magnetic modulators which modulate such magnetic field strength frequencies at the same frequency but at different phases such that the net modulation of each modulating device upon a constant magnetic field is zero, means for recording the resulting magnetic difference beat frequencies on said magnetic tape, reproducing means including means for passing the magnetizable tape through said reproducing means to reproduce said difference magnetic beat frequencies, and means for modulating the reproduced difference magnetic beat frequencies each at the same frequency and relative phases as the original magnetic field strength frequency was modulated to produce such difference magnetic beat frequency before its recording to thereby reproduce the original magnetic field strength frequency.

10. A system for recording and reproducing sound comprising, means for converting sound waves into magnetic density fluctuations, a magnetizable recording tape, modulating means for modulating the magnetic density fluctuations at a plurality of groups of frequencies of which the modulating means of each group modulates the magnetic density fluctuation at plurality of locations in multiple at the same frequency and phase displaced so that the net modulation of a steady magnetic field is zero, means for magnetically recording the difference magnetic beat frequencies but not the sum beat frequencies created by such modulation of the magnetic density fluctuations on said recording tape, means for reproducing said difference magnetic beat frequencies from said tape, means for modulating each difference beat frequency at the same frequency and relative phases as that at which the magnetic density fluctuation from which it was created was modulated prior to its recording, and means for converting the resultant magnetic density fluctuation into sound.

11. A system for recording and reproducing sound consisting of a plurality of sound frequencies comprising, means for converting sound into magnetic flux density frequencies, means for modulating said frequencies at a plurality of modulating frequencies characterizing phase rotation and in a manner so as to result in the production of difference magnetic density beat frequencies having characteristics that distinguish them from each other by both their frequency and direction of phase rotation, a magnetizable recording tape, means for reproducing said difference magnetic density beat frequencies from said recording tape, means for modulating each of said reproduced difference magnetic density beat frequencies at the same modulating frequency and phase rotation as that at which the magnetic flux density frequency from which it was created was modulated before its recording and also in a manner such that a summation frequency only will be produced when the magnetic density beat frequency resulted from modulating a magnetic flux density frequency by a lower modulating frequency and a difference frequency will ony be produced when the magnetic density beat frequency resulted from modulating a magnetic flux density frequency by a higher modulating frequency.

12. A system for recording and reproducing sound consisting of a plurality of sound frequencies, means for converting said sound frequencies into magnetic flux density frequencies, means for modulating said magnetic flux density frequencies at a plurality of groups of modulating frequencies of which each group is of a different frequency from the frequency of other groups and of which all frequencies of each group are of the same frequency but displaced in phase from adjacent frequencies of the same group to that part of a cycle as there are modulating frequencies in that group, means for magnetically recording the difference magnetic density beat frequencies so created, means for reproducing said magnetic density beat frequencies, and means for again modulating each magnetic density beat frequency reproduced at the same frequency and relative phase displacement as that at which the original magnetic flux density frequency from which it was created was modulated to produce such recorded beat frequency to thereby reproduce the original magnetic flux density frequency.

13. The method of recording and reproducing sound which resides in converting sound into electro-magnetic flux density oscillations, in resolving such magnetic flux density oscillations into a plurality of groups of flux density frequencies, in modulating each of these groups of flux density frequencies at a modulating frequency characterizing a direction of phase rotation to obtain flux density beat frequencies and in a manner so that two difference beat frequencies of the same frequency which are derived by modulating a flux density frequency that is higher by a predetermined number or cycles than the modulating frequency and a flux density frequency that is lower by the same predetermined number of cycles than the modulating frequency are distinctively retained, in magnetically recording only the difference flux density beat frequencies on separate portions of a record tape, in reproducing these difference flux density beat frequencies from such record tape, and in again modulating each of these difference flux density beat frequencies at the same frequency and in the same manner of phase rotation as the original flux density frequency from which such flux density beat frequency was created was modulated before the recording to thereby reproduce the original flux density frequency to thereby reproduce the two original flux density frequencies.

14. A recorder for recording sound comprising, means for converting sound waves into fluctuating magnetic intensity, a magnetizable recording tape, a modulating means consisting of a series of groups of modulator magnetic channels, each channel including a ferromagnetic modulator member, each member of a group modulating the intensity of the magnetism passing through its channel at a frequency characteristic of the group but differing in phase from other members of the group, the phase differences of the various member of the group being so chosen that the net mean magnetism intensity transmitted by a constant magneto-motive-force through the sum of the channels of a group at any instant is constant, magnetic recording means including means for moving such magnetizable tape by an air-gap across which the magnetism of said channels is caused to pass to thereby magnetize an increment of said magnetizable tape for a period of time during its movement sufficiently long to average out the sum frequencies produced in a channel by such modulation and sufficiently short to allow difference beat frequencies to appear as fluctuation in residual magnetism intensity of the part of the tape then engaging the air-gap.

15. Sound reproducing means for producing sound from a magnetizable tape on which difference beat frequencies have been magnetically recorded on separate traces the traces being separated into groups each group of traces having recorded thereon difference beat frequencies from like modulating frequencies differing in phase and acting on the original sound frequencies which modulating frequencies differed in phase and produced magnetic density beat frequencies differing in phase with respect to each other and bearing relations with respect to each other such as to characterize the original sound frequency as to whether it was higher or lower than the modulating frequency for that group, such sound reproducing means comprising, means for causing such magnetizable tape to pass by an airgap in an electro-magnet of said reproducing means, a magnetic modulating means acting on said electro-magnet for converting the beat frequencies recorded on said magnetizable tape into new frequencies of fluctuating magnetic intensities, and means for converting such fluctuating magnetic intensities into sound waves.

16. In combination, an electro-magnet consisting of a core structure having two airgaps in multiple and a coil linking the magnetic circuit passing through said magnetic airgaps in multiple, a multi-frequency multi-phase ferromagnetic modulating means bridging one of said airgaps, a magnetizable recording tape, said modulator means including a plurality of ferromagnetic toothed disks separated by non-magnetic disks, and means for moving said tape transversely by the other of said airgaps.

17. The invention as claimed in claim 16 wherein the two airgaps are in series in the core structure.

18. Recording-playback apparatus comprising, an electro-magnet consisting of a U-shaped core and a coil linking said core, a polepiece structure having two airgaps in multiple and magnetically associated with said core through two airgaps in series one between each end of said pole-piece structure and an end of said U-shaped core, said pole-piece structure being laminated in a plane of the flux path and a plane passing through said two airgaps in multiple, sheets of non-ferromagnetic material for spacing such laminae, a modulating cylinder for bridging one of said airgaps in multiple and consisting of a plurality of iron disks one for each laminae of said pole-piece structure and lying in the same plane as the corresponding laminae and having sheets of non-ferromagnetic material for spacing said iron disks to the same extent as said laminae are spaced, a magnetizable record tape, and means for moving said record tape transversely by the other of said two airgaps in multiple.

19. The invention as claimed in claim 10 wherein the means for magnetically recording and reproducing and the means for modulating each include an airgap and wherein these two airgaps are in multiple in a magnetic circuit.

20. The invention as claimed in claim 14 wherein the modulating means and the magnetic recording means each include an airgap and wherein these two airgaps are included in series in a magnetic circuit.

21. In combination, means for converting sound vibrations into current oscillations, an electro magnet having an airgap, a coil on said electro-magnet and energized by said current oscillations, the magnetic circuit in said electro-magnet and extending through said coil constituting a plurality of low reluctance paths in multiple, a modulator in each path for intermittently changing the reluctance of such path, said modulators constituting groups of modulators wherein the modulators of each group modulate the reluctance of the magnetic path with which it is associated at the same frequency but displaced in phase so that the net modulation of a constant magneto-motive force applied to such paths of a particular group induce no potential in said coil, a ferromagnetic recording tape, and means for moving said tape by said airgap in a direction transverse thereto for recording the magnetic density in each path in accordance with the passing of time, whereby beat frequencies dependent on the frequencies of the current oscillations and the frequencies of said modulators and their respective phases in each path are recorded, and means for reproducing said sound vibrations comprising, means for reproducing said magnetic beat frequencies and their respective phases in respective magnetic paths, means for again modulating the reproduced magnetic beat frequencies in each path at the same modulating frequency and relative phase as the paths from which they were originally recorded were modulated before such recording, and means for converting the magnetic oscillations so reproduced to sound vibrations.

22. In combination, means for converting sound vibrations into current oscillations, an electro-magnet having an airgap, a coil linking said electro-magnet and energized by said current oscillations, the magnetic circuit of said electro-magnet and linking said coil being divided into a plurality of low reluctance paths in multiple arranged side by side in said airgap, a modulator in each path for intermittently changing the reluctance of such path, said modulators constituting groups of modulators wherein the modulators of each group modulate the reluctance of the path with which each is associated at the same frequency but displaced in phase so that the net modulation of a constant magneto-motive force applied to the paths of a particular group induces no potential in said coil, a ferromagnetic recording tape, and means for moving said recording tape by said airgap in a direction transverse thereto for recording the magnetic density in each path in separate paths on said recording tape in accordance with the passing of time, whereby beat frequencies dependent for their frequency on the frequencies of the current oscillations and the frequencies of the modulators and their respective phases for each group are magnetically recorded on separate paths on said tape, and means for reproducing said sound vibrations comprising, means for reproducing said magnetic beat frequencies and their respective phases in respective magnetic paths from said tape, means for again modulating the reproduced magnetic beat frequencies in said path at the same modulating frequency and relative phase with respect to other like frequency modulations as the magnetic paths from which they were originally recorded were modulated before such recording, means for converting these magnetic oscillations into current oscillations, and means for converting these last mentioned current oscillations to sound vibrations.

ROBERT H. DICKE.

References Cited in the file of this patent

UNITED STATES PATENTS

| Number | Name | Date |
|---|---|---|
| 2,423,339 | Newman | July 1, 1947 |
| 2,424,295 | Williams | July 22, 1947 |